United States Patent [19]

Gantner et al.

[11] Patent Number: 4,781,410
[45] Date of Patent: Nov. 1, 1988

[54] REMOVABLE ROOF ASSEMBLY WITH IMPROVED WIND DEFLECTOR

[75] Inventors: Bruce M. Gantner, Rochester; Mark Gorentz, Milford, both of Mich.

[73] Assignee: Webasto Sunroof, Inc., Rochester Hills, Mich.

[21] Appl. No.: 310

[22] Filed: Jan. 5, 1987

[51] Int. Cl.⁴ .................................................. B60J 7/22
[52] U.S. Cl. ..................................... 296/217; 296/218; 296/224
[58] Field of Search ........................ 296/217, 218, 224; 49/465

[56] References Cited

U.S. PATENT DOCUMENTS

| 4,165,120 | 8/1979 | Jardin et al. | 296/217 |
| 4,268,085 | 5/1981 | Sakai et al. | 296/217 |
| 4,342,481 | 8/1982 | Kanou et al. | 296/217 |

FOREIGN PATENT DOCUMENTS

| 1262135 | 2/1968 | Fed. Rep. of Germany | 296/217 |
| 3218449 | 12/1982 | Fed. Rep. of Germany | 296/217 |
| 1161942 | 9/1958 | France | 296/217 |
| 7510515 | 3/1977 | Netherlands | 296/217 |

Primary Examiner—Dennis H. Pedder
Attorney, Agent, or Firm—Cushman, Darby & Cushman

[57] ABSTRACT

A removable roof assembly including a wind deflector structure of a size and shape to be mounted with respect to a passenger vehicle roof opening when a removable roof structure of the assembly is in its removed condition in an operative position extending above and along the forward end of the vehicle roof opening and above and rearwardly along the sides thereof such that the removable roof structure cannot be fully seated. A first mechanism is provided for retaining the wind deflector structure in its operative position and for enabling the wind deflector structure to be moved out of its operative position in response to a manual movement of the removable roof. The wind deflector is mounted to the vehicle roof by a system of at least three links defining four distinct pivot axes.

19 Claims, 7 Drawing Sheets

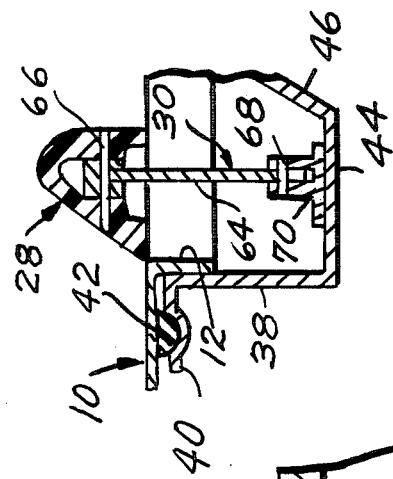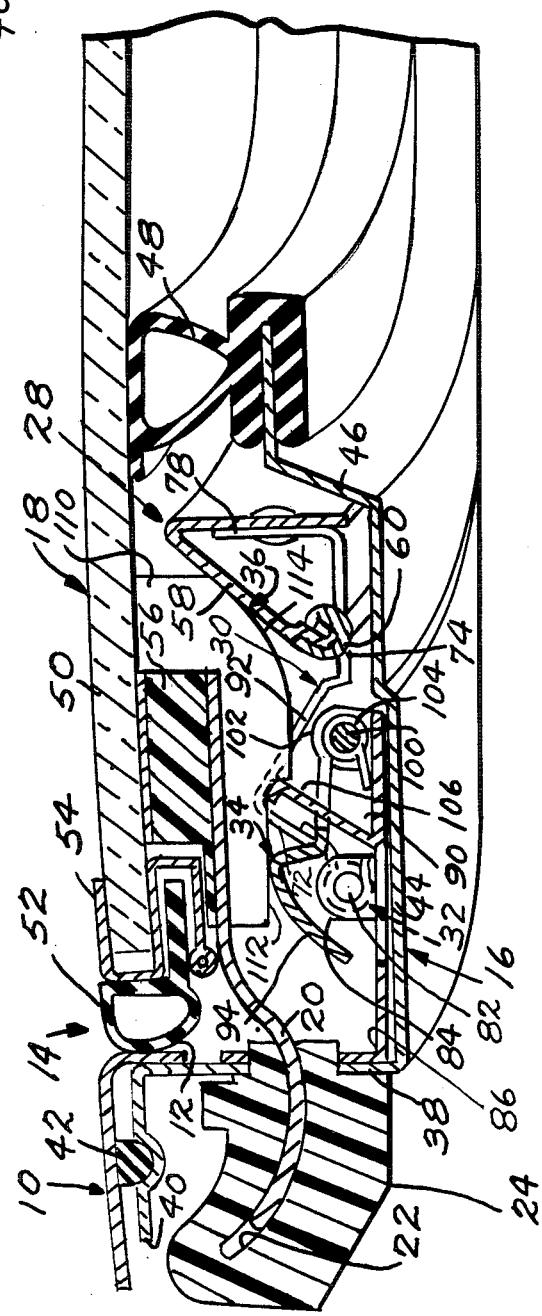

REMOVABLE ROOF ASSEMBLY WITH IMPROVED WIND DEFLECTOR

This invention relates to passenger vehicle roof structures and more particularly in an improved removable roof assembly for an opening in such a roof structure.

Removable roof assemblies for openings in passenger roof structures are well known. One example of a removable roof assembly of this type is disclosed in U.S. Pat. No. 4,165,120. The patent discloses a removable roof structure having a pair of horizontally spaced tongues or plug in elements along the forward end thereof for engagement with correspondingly shaped grooves or receiving elements carried by the forward end of the peripheral housing disposed below the periphery of the opening in the stationary roof structure. Between the rearward end of the removable roof structure and the rearward end of the peripheral housing there is provided a mechanism which serves to releasably secure the rearward end of the removable roof in a closed position when the forward tongues are engaged within their receiving grooves. The mechanism also serves to maintain the removable roof in a rearwardly and upwardly tilted position. Of course, the mechanism is releasable to allow the removable roof to be moved into a removed condition. The patent also discloses the provision of a separate wind deflector structure having a pair of forward tongues for engaging within the same grooves which receive the forward tongues of the removable roof. One problem with this arrangement is that the separate wind deflector structure is difficult to manipulate. Another is that it presents a storage difficulty.

U.S. Pat. No. 4,342,481 discloses a removable roof assembly in which these two problems of the removable roof assembly of the earlier patent are addressed. Specifically, the wind deflector structure is mounted on the peripheral housing of the roof opening for movement between storage and operative positions by a spring-biased linkage mechanism. The roof structure is provided with a latch groove which engages a link member of the linkage mechanism so as to enable the wind deflector structure to be moved from its spring biased operative position into its storage position in response to the movement of the removable roof structure from its removed condition into its closed position. The arrangement is such that the removable roof structure when in its closed position retains the wind deflector structure in its storage position so that when the removable roof structure is again moved out of its closed position into its removed condition, the wind deflector structure is at the same time spring biased into its operative position. A problem with this arrangement is that the necessity to make the movement of the wind deflector structure solely controlled by the movement of the removable roof structure places severe limitations on the shape which the wind deflector structure can assume, the operative position which the wind deflector structure could assume and the movement which the wind deflector structure can undertake between its operative and storage positions.

An object of the present invention is to provide a removable roof assembly which achieves in large measure the advantages of the later patented removable roof assembly over the earlier patented one, while at the same time eliminating the problem and disadvantages thereof discussed above. In accordance with the principles of the present invention this objective is obtained by providing a wind deflector structure of a size and shape to be mounted with respect to the passenger vehicle roof opening when the removable roof structure is in its removed condition in an operative position extending above and along the forward end of the vehicle roof opening and above and rearwardly along the sides thereof such that full operative interengagement of the forward tongues of the removable roof structure within the receiving grooves of the peripheral housing is blocked. A first mechanism is provided for retaining the wind deflector structure in its operative position and for enabling the wind deflector structure to be moved out of its operative position in response to a manual movement. A mounting mechanism serves to mount the wind deflector structure on the housing (1) for movement out of its operative position into a storage position within the vehicle roof opening wherein full operative interengagement of the tongues with the grooves is no longer blocked thereby and (2) for movement from its storage position into its operative position which is prevented when the removable roof structure is in its closed position. A second mechanism is provided for (1) retaining the wind deflector structure in the storage position when moved therein with the removable roof structure in its removed condition so as to enable the tongues to be fully operatively interengaged with the grooves while the wind deflector structure is retained in its storage position and the removable roof structure to be moved into its closed position and (2) enabling the wind deflector structure to be moved into said operative position when the removable roof structure is in its removed condition.

Preferably, the first mechanism comprises a spring for resiliently biasing the wind deflector structure out of its storage position and into its operative position so as to resiliently retain the same therein and the second mechanism comprises a latch operable in response to the manual movement of the wind deflector structure from its operative position into its storage position against the bias of the spring to releasably retain the same therein and cam surfaces on the removable roof structure operable in response to the movement of the removable roof structure into its closed position for releasing the latch and controlling the movement of the wind deflector structure under the bias of the spring so that the wind deflector structure is biased by the spring to move out of its storage position and into its operative position in response to the movement of the removable roof structure out of its closed position into its removed condition.

Another object of the present invention is the provision of a removable roof assembly of the type described which is simple in construction, effective in operation, easy to operate and economical to manufacture and maintain.

These and other objects of the present invention will become more apparent during the course of the following detailed description and appended claims.

The invention may best be understood with reference to the accompanying drawings wherein an illustrative embodiment is shown.

In the drawings:

FIG. 6 is a view similar to FIG. 4 showing the removable roof structure in its closed position;

FIG. 8 is a fragmentary sectional view taken along the line 8—8 of FIG. 4.

Figure 1:
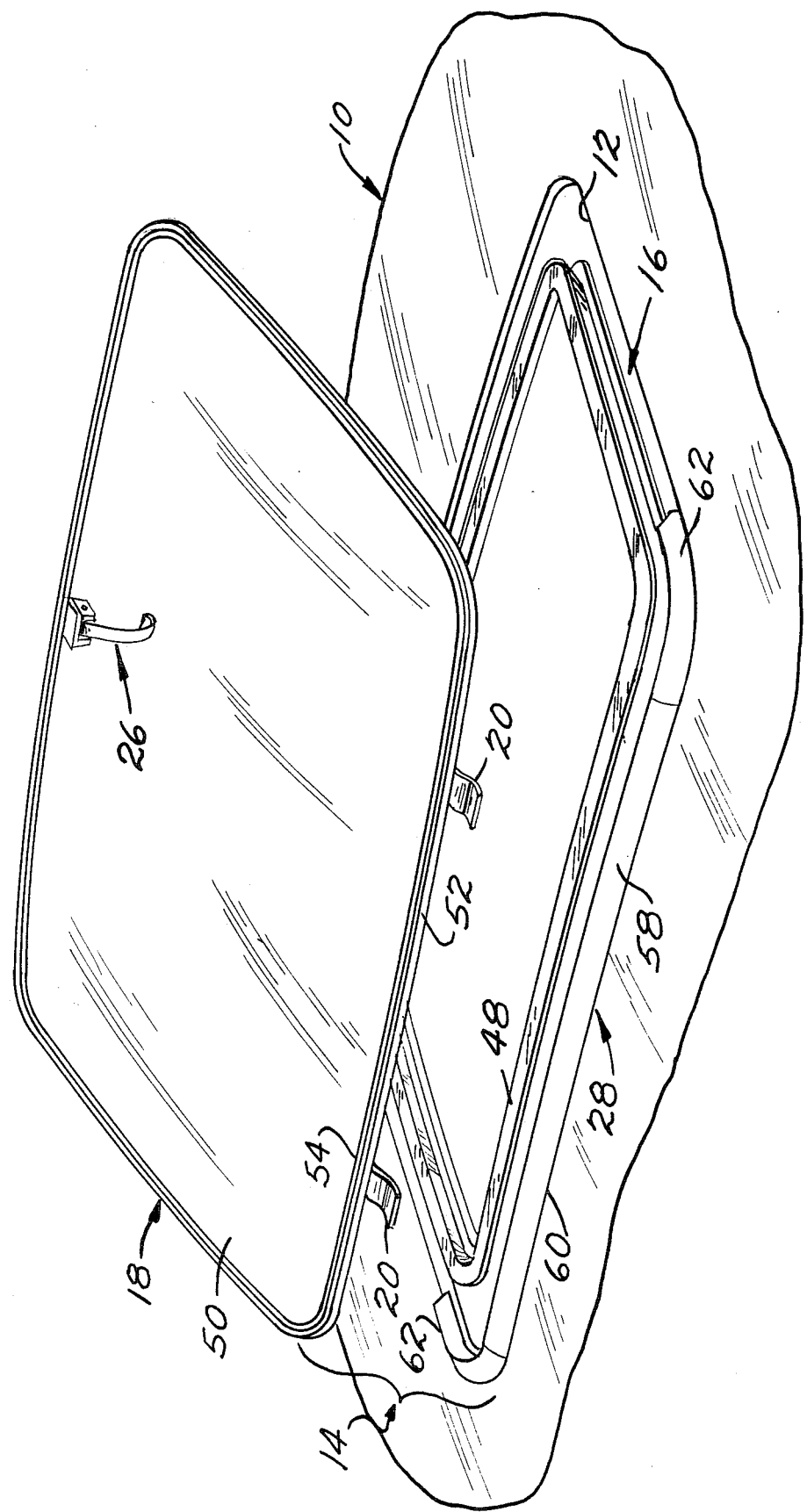
FIG. 1 is a perspective view of a passenger vehicle roof showing the removable roof assembly of the present invention with the removable roof structure in its removed condition and the wind deflector structure in its operative position.
Figure 2:
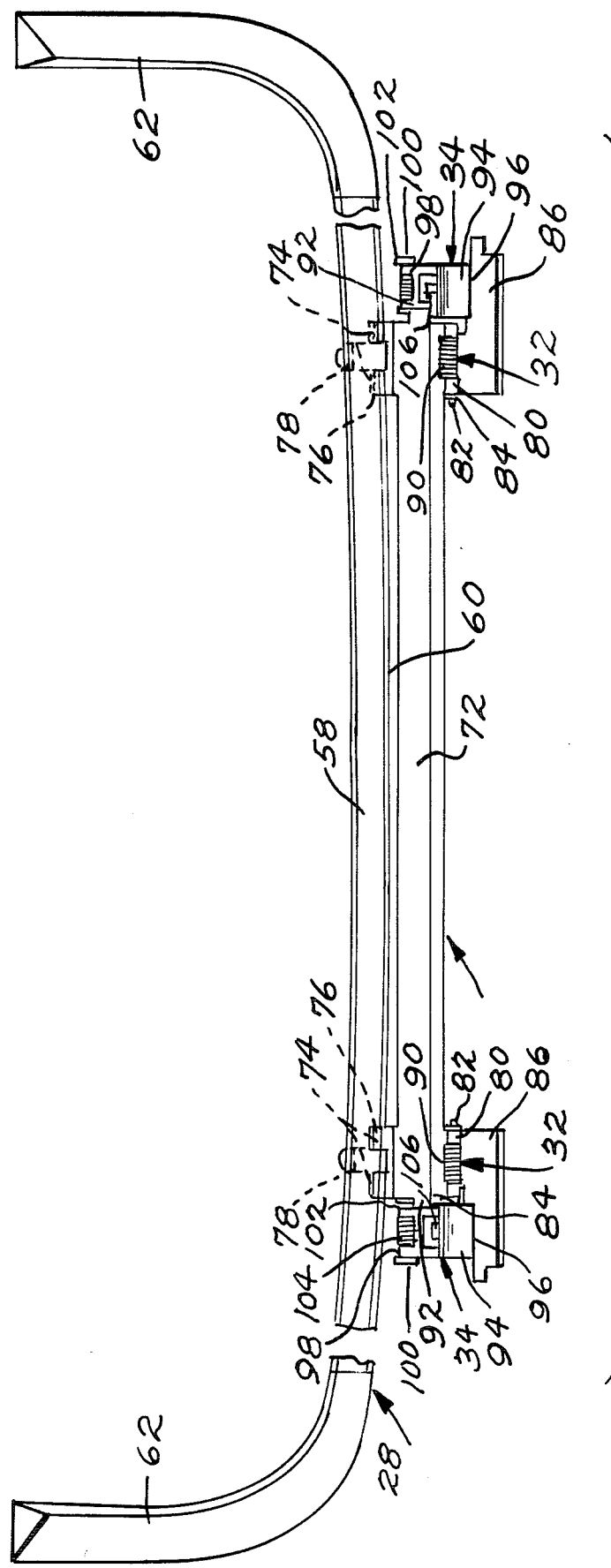
FIG. 2 is a top plan view of the wind deflector structure in its latched storage position and the associated forward mounting mechanism.

Referring now more particularly to the drawings, there is shown in FIG. 1 thereof a passenger vehicle roof 10 having a opening 12 therein within which is mounted a removable roof assembly, generally indicated at 14, constructed in accordance with the principles of the present invention. The removable roof assembly 14 includes a peripheral housing assembly, generally indicated at 16, mounted in the periphery of the vehicle roof opening 12 and extending inwardly thereof. The assembly 14 also includes a removable roof-structure, generally indicated at 18, of a size and shape to be mounted in a closed position with respect to the vehicle roof opening 12. The manner in which the removable roof structure 18 is mounted for movement from a removed condition into a closed position with respect to the vehicle roof opening 12 and out of its closed position into its removed condition is well known. As shown, the removable roof structure includes a pair of forwardly extending curved tongues 20 which are adapted to engage fully operatively within grooves 22 formed in receiving members 24 fixed to the housing assembly along the forward end thereof when the removable roof structure is in its closed position. The rearward end of the removable roof structure 18 is detachably connected with the rearward end of the peripheral housing assembly 16 by a securing mechanism, generally indicated at 26, which serves to releasably lock the removable roof structure 18 in its closed position and to retain the removable roof structure in an upwardly and rearwardly tilted partially open position as well as to permit removal of the roof structure into its removed condition. The securing mechanism 26 is illustrated in FIG. 1 schematically and the details of construction of the mechanism do not form any part of the present invention. For purposes of a more detailed disclosure, reference is made to the two patents identified earlier in the specification, the disclosures of both of which are hereby incorporated by reference into the present specification.

In accordance with the principles of the present invention, the removable roof assembly 14 includes a wind deflector structure, generally indicated at 28, which is of a size and shape suitable to be mounted with respect to the vehicle roof opening 12 when the removable roof structure 18 is its removed condition in an operative position, as shown in FIG. 1. As shown, the wind deflector structure 28 extends above and along the forward end of the vehicle roof opening 12 and above and rearwardly along the sides thereof such that full operative interengagement of the forward tongues 20 of the removable roof structure 18 with the grooves 22 of the receiving members 24 is blocked. That is, the presence of the wind deflector's structure in its operative position blocks the removable roof structure from being moved into its closed position where the tongues 20 and grooves 22 are fully operatively interengaged.

Figure 4:
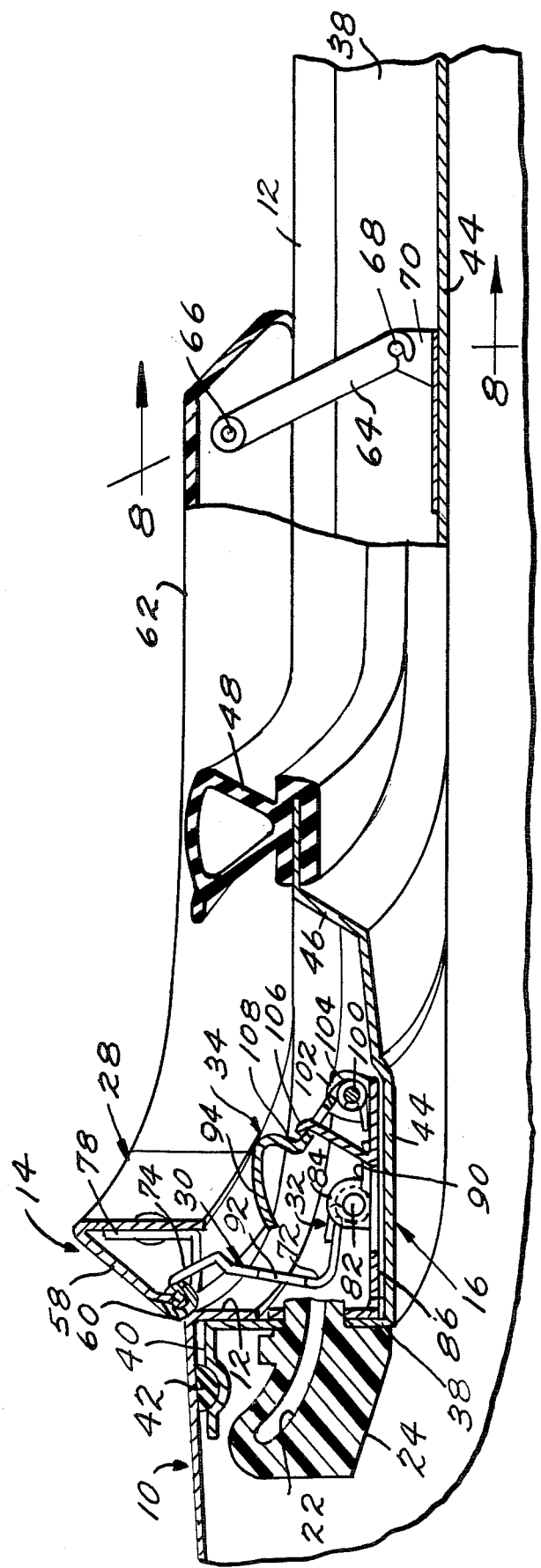
FIG. 4 is a fragmentary sectional view taken along the line 4—4 of FIG. 3.
Figure 5:
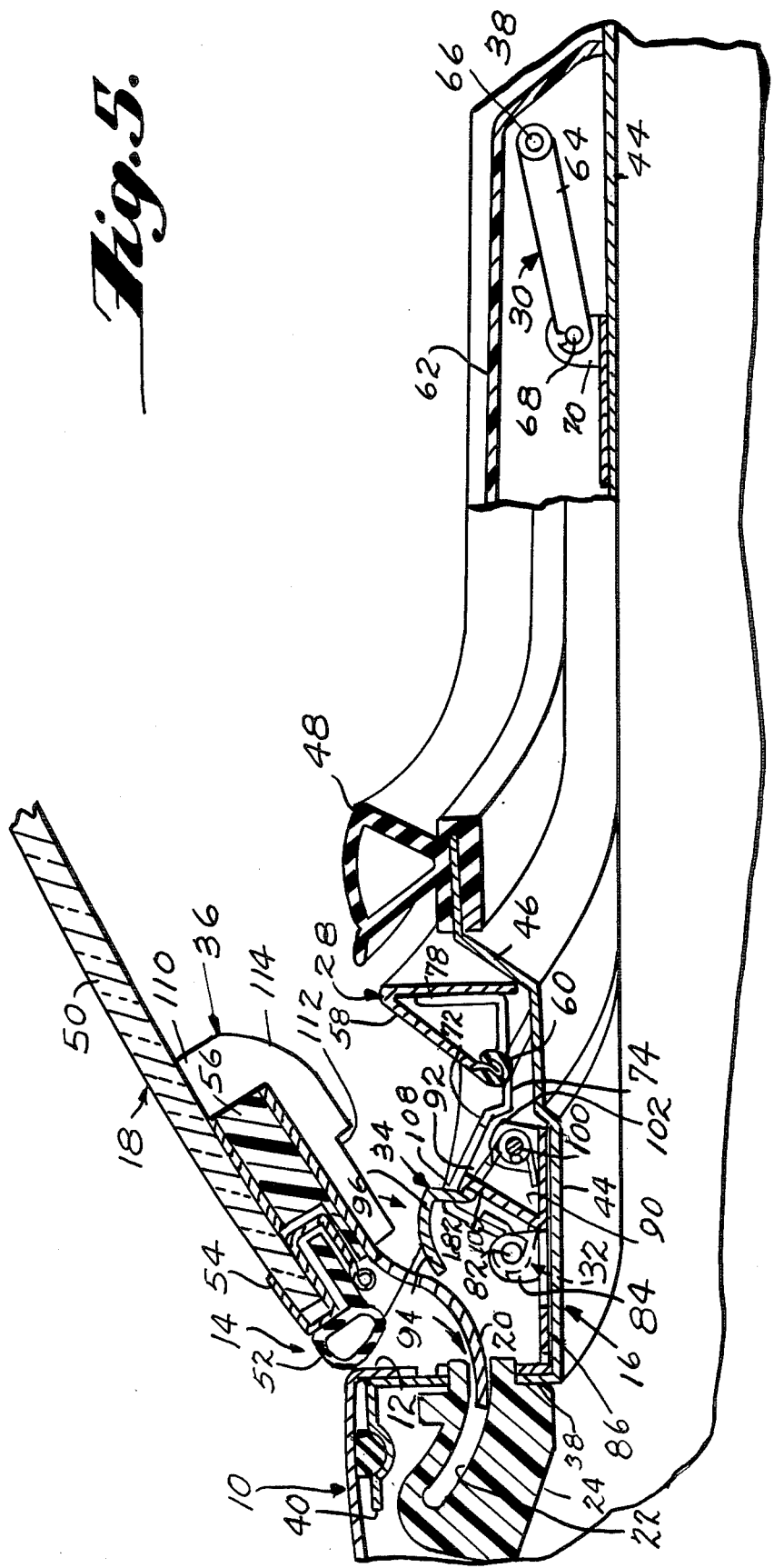
FIG. 5 is a view similar to FIG. 4 showing the wind deflector structure latched in its storage position and the removable roof structure being moved into its closed position.

The wind deflector structure 28 is mounted on the housing assembly 16 by a linkage mechanism, generally indicated at 30. The linkage mechanism 30 serves to mount the wind deflector structure 28 on the housing assembly 16 (1) for movement out of its operative position, as shown in FIGS. 1 and 4, into a storage position, as shown in FIGS. 5 and 6. In its storage position, the wind deflector structure 28 is disposed beneath the vehicle roof opening 12 in such a way that the full operative interengagement of the tongues 20 with the grooves 22 is allowed to take place so that the removable roof structure can be moved into its closed position. Moreover, the linkage mechanism 30 also serves to mount the wind deflector structure 28 for movement from its storage position back into its operative position. It will be noted from FIG. 6, however, that this movement is prevented when the removable roof structure 18 is in its closed position.

The removable roof assembly 14 includes a first mechanism preferably in the form of a spring mechanism 32 for retaining the wind deflector structure 28 in its operating position and for enabling the wind deflector structure to be moved out of its operating position in response to a manual movement. The removable roof assembly 14 also includes a second mechanism or means preferably in the form of a latch mechanism, generally indicated at 34, on the housing assembly 16 and a cam assembly, generally indicated at 36, on the removable roof structure 18 operable to (1) retain the wind deflector structure 28 in its storage position when moved therein with the removable roof structure in its removed condition so as to enable the tongues 20 to be interengaged with the grooves 22 while the wind deflector structure 28 is retained in its storage position, thus allowing the removable roof structure 18 to be further moved into its closed position and (2) enable the wind deflector structure 28 to be moved into its operative position when the removable roof structure 18 is in its removed condition.

Figure 7:
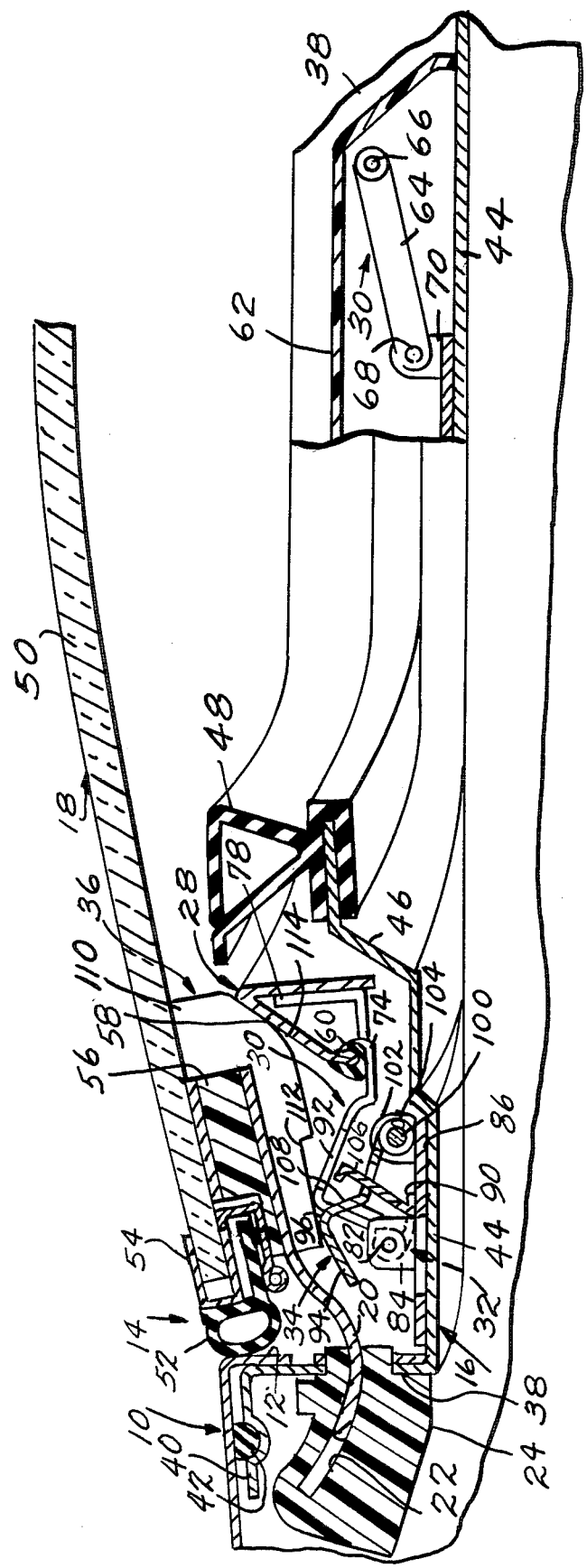
FIG. 7 is a view similar to FIG. 4 showing an intermediate position of the parts when the removable roof structure is being moved out of its closed position.

Preferably, the spring mechanism 32 acts between the wind deflector structure 28 and the housing assembly 16 and is operable to resiliently bias the wind deflector structure 28 out of its storage position and into its operative position so that it is resiliently retained therein by the spring mechanism 32. The latch mechanism 34 is carried by the housing assembly 16 and is operable in response to a direct manual movement of the wind deflector structure 28 by a user from its operative position into its storage position against the bias of the spring mechanism 32 to releasably retain the wind deflector structure 18 in its storage position as shown in FIG. 5. Also as shown in that Figure, the cam assembly 36 is operable in response to the movement of the removable roof structure 18 into its closed position to release the latch mechanism 34 and to assume control of the movement of the wind deflector structure 28 under the bias of the spring mechanism 32. Consequently, when the removable roof structure 18 is moved out of its closed position, as shown in FIG. 7, the wind deflector structure 28 is biased by the spring mechanism 32 to move out of its storage position and into its operative position in response to the movement of the removable roof structure 18 out of its closed position and into its removed condition.

Figure 3:
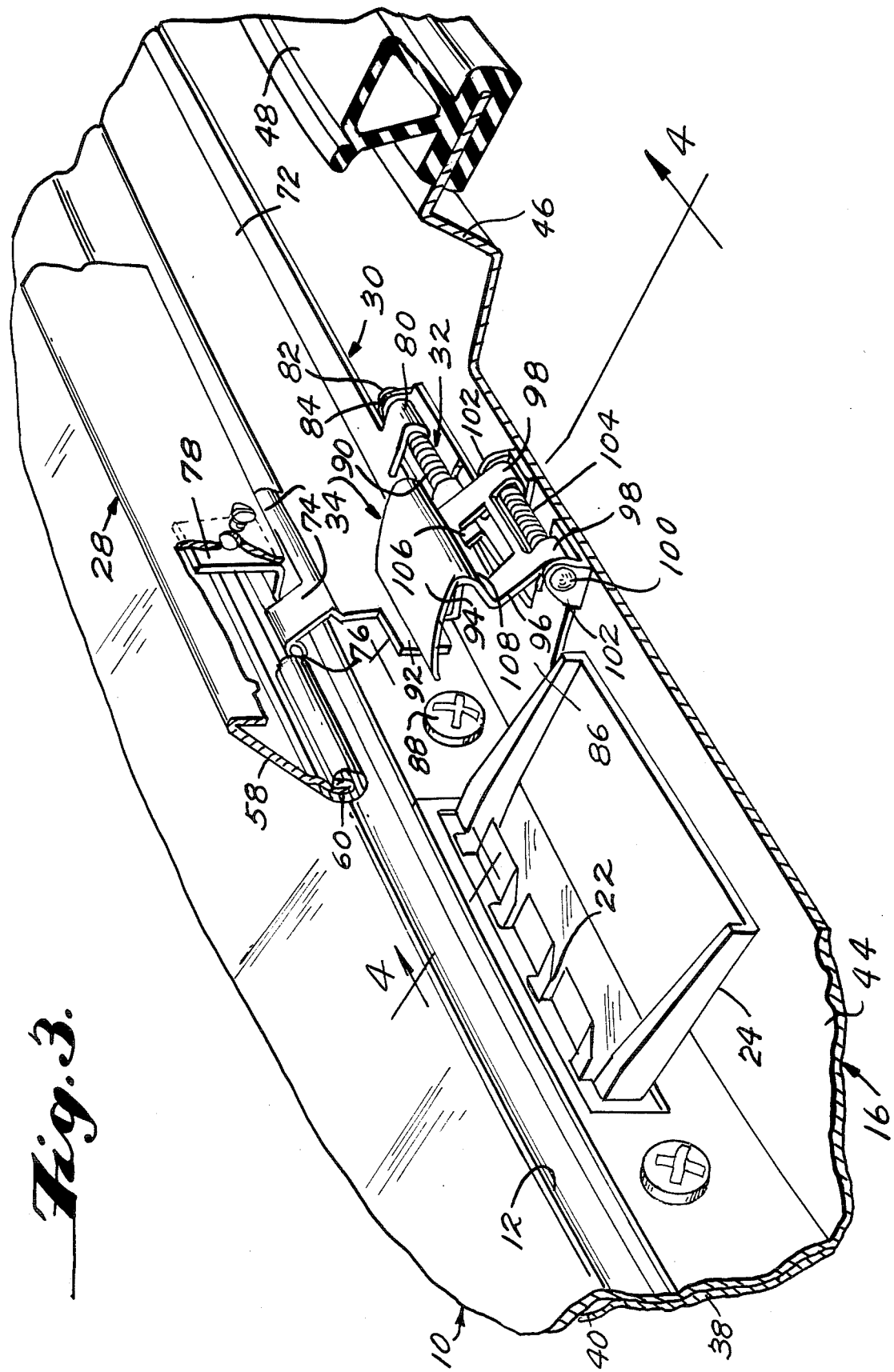
FIG. 3 is a fragmentary perspective view illustrating the forward mounting mechanism of the wind deflector structure in its operative position.

Referring now more particularly to FIGS. 3 and 4, the peripheral housing assembly 16 is in the form of a bent sheet metal marginal trough which is disposed below the opening well and extends inwardly and outwardly thereof. The opening 12 is defined by a downturned flange of the roof material and the sheet metal forming the housing assembly 16 includes a vertical wall portion 38 which is welded along its upper edge to the interior surface of the depending flange defining the opening 12. A horizontal flange 40 extends outwardly from the upper end of the vertical wall portion 38. The flange 40 has a groove formed therein for receiving a sealing element 42 which engages beneath the roof 10. Extending inwardly from the lower end of the vertical wall portion 38 is a horizontally extending wall portion 44. The inner end of the horizontal wall portion 44 has a generally angularly shaped wall portion 46 extending upwardly and inwardly thereof. Mounted on the free end of the angular wall portion 46 is a peripheral seal member 48 having an upper surface which is disposed in a position to engage and seal with the lower surface of the removable roof structure 18.

The removable roof structure 18 may be of any well known construction. As shown, the removable roof structure 18 includes a main glass panel 50 having a peripheral seal 52 secured therearound as by a peripheral molding strip 54. The tongues 20 are secured to the glass panel 50, as by a mounting block 56, at a position adjacent and below the forward end thereof.

The wind deflector structure 28 is preferably U-shaped in plan view and includes a bight portion 58 which is preferably formed of an inverted V-shaped aluminum extrusion having a seal bead 60 mounted along the free end of the forward leg of the V which extends therefrom upwardly and rearwardly. The rearward leg of the V extends vertically downwardly from the forward leg with a slight rearward incline. The U-shaped wind deflector structure 28 also includes a pair of rearwardly extending leg portions 62 which preferably are molded of a suitable plastic material.

The linkage mechanism 30 is preferably a parallel linkage and includes a pair of rearward link members 64 each of which are connected at one of its ends to a pivot pin 66 extending through a rear end section of an associated leg portion 62 so as to pivot the link members 64 to the two leg portions 62 about a first horizontally extending axis coincident with the common axes of the pivot pins 66. The opposite end of each link member 64 is pivoted to a pivot pin 68 mounted in a bracket 70 fixed to the associated horizontal wall portion 44 of the side sections of the peripheral housing assembly 16. The opposite ends of the link members 64 are thus pivoted about a second fixed axis coincident with the common axes of the pivot pins 68, which axis is parallel with the first axis 66 which moves with the link members 64 and the leg portions 62 of the wind deflector structure 28.

The linkage mechanism 30 also includes a forward link member 72 which, as shown, is in the form of a horizontally elongated sheet metal member of generally L-shaped configuration in cross-section. Extending laterally from opposite ends of the elongated link member 72 is a pair of integral longitudinally spaced ears 74, the free ends of which are formed into a circular configuration to receive a pivot pin 76. The pivot pin also extends through a circularly curled free end of an L-shaped mounting bracket 78 which is suitably fixed to the interior of the central section of the bight portion 58 of the wind deflector structure 28. As best shown in FIG. 3, the link member 72 also includes a pair of integral ears 80 extending generally in an opposite direction from each pair of ears 74. As before, the free ends of the ears 80 are formed into a circular configuration to receive a pivot pin 82. Pivot pin 82 also extends through a pair of integral upright ears 84 formed on an L-shaped mounting bracket 86 suitably fixed to the vertical wall portion 38 of the housing assembly 16, as by bolts 88 or the like. The link member 72 is thus pivoted to the wind deflector structure 28 about a third axis which is common to the axes of the two pivot pins 66, which third axis is parallel with the first and second axes provided by the pivot pins 66 and 68. The link member 72 is pivoted to the housing assembly 16 for pivotal movement about a fourth fixed axis which is coincident with the common axes of the pivot pins 82. As previously indicated, the linkage mechanism 30 thus provided is preferably a parallel linkage in which the link members are essentially disposed in parallel relation with one another and in which the distance between the first and second pivotal axes provided by the pivot pins 66 and 68 is equal to the distance between the third and fourth pivotal axes provided by the pivot pins 76 and 82. It will be understood however that these distances may be varied if desired. A distinct advantage of the utilization of a parallel linkage resides in the stability provided for the leg portions 62 of the wind deflector structure when in its operative position.

It will also be noted that the leg portions 62 extend generally horizontally when in its storage position and in its operating position and any position therebetween.

Mounted in surrounding relation to each of the pivot pins 82 is a torsional coil spring 90 having one end abuttingly engaging the link member 72 and an opposite end engaging the mounting bracket 86 so as to resiliently urge the link member 72 to pivot in a counterclockwise direction, as viewed in FIGS. 4-7, so as to move the wind deflector structure 28 in a direction from its storage position as shown in FIGS. 5 and 6 into its operative position as shown in FIG. 4. In the latter position, it will be noted that the bead 60 along the lower edge of the bight portion 58 of the wind deflector structure 28 engages the upper edge of the forward end of the opening 12 and the lower outer edges of the leg portions 62 are disposed closely adjacent the upper edge of the opening along the sides thereof.

Extending outwardly from opposite ends of the elongated link member 72 is a pair of latch engaging integral tabs 92 each of which is disposed in a position when the wind deflector structure 28 is in its operative position to engage a cam surface 94 formed on an associated pivoted latch member 96. The pair of latch members 96 constitute the latching mechanism 34. Each latch member 96 is preferably formed of sheet metal and includes a pair of ears 98 having its free ends formed into a circular configuration to receive a pivot pin 100 therethrough. The pivot pin 100 also extends through a pair of ears 102 bent upwardly from the sheet metal forming the bracket 86. A torsional coil spring 104 is disposed in surrounding relation with each pivot pin 100 and has one of its ends engaged with the associated latch member 96 and its other end engaged with the bracket 86 so as to resiliently bias the latch member 96 to move in a clockwise direction as viewed in FIGS. 4-7. It will be noted that pivot pins 100 provide a pivotal axis which is spaced rearwardly from and in parallel relation to the axis provided by pivot pins 82. A stop finger 106 is struck from the sheet metal of the bracket 86 and is bent upwardly so that a bent free end thereof engages the associated latch member when urged into a latching position as shown in FIGS. 4 and 5. As shown in FIG. 5, when the wind deflector structure 28 is moved into its storage position a locking surface 108 engages the leading edge of the associated tab 92 to thereby releasably retain the wind deflector structure 28 in its storage position.

The cam mechanism 38 includes a pair of fixed cam members 110 disposed transversely in a position of alignment with the cam surfaces 94 of the latch members 96 laterally outwardly of the tabs 92. Each cam member 110 includes a forward latch engaging cam surface 112 and a rearward wind deflector structure engaging surface 114.

FIG. 6 illustrates the position of the parts when the removable roof structure 18 is disposed in its closed position with the opening 12 of the vehicle roof 10. It will be noted that the wind deflector structure 28 is disposed in its closed position. However, the rearward cam surfaces 114 of the cam members 110 are in engagement with the bight portion 58 of the wind deflector structure 28 so as to retain the same in its storage position and to assume control of its movement therefrom under the bias of springs 90. Moreover, it will also be noted that the forward cam surfaces 112 are in engagement with the cam surfaces 94 of the latch members 96 so as to hold the latch members out of their latching positions. It will be understood that the removable roof structure 18 can be moved into its partially open position by simply manipulating the securing mechanism 26 (see for example the aforesaid patents). During this movement, the wind deflector structure 28 and latch members 96 are retained in essentially the same positions as shown in FIG. 5. When it is desired to move the removable roof structure 18 into its removed condition beyond the position of partial opening it can be seen that the shape of the cam surfaces 112 and 114 are such as to allow the wind deflector structure 28 to move under the action of the springs 90 into a position wherein the tabs 92 move beyond the locking surfaces 108 of the latch members 96 so that further movement of the wind deflector structure 28 as the removable roof structure 18 is moved away from its closed position can take place so that finally when the removable roof structure 18 is in its removed condition the wind deflector structure 28 will be moved by springs 90 into its operative position as shown in FIG. 4. Moreover, the tabs 92 will have moved out of engagement with the cam surfaces 94 of the latch members 96 so that the position of the parts is as shown in FIG. 4.

When it is desired to again move the removable roof structure 18 from its removed condition into its closed position, the wind deflector structure is in its operative position physically blocks the tongues 20 of the removable roof structure 18 from being fully operatively interengaged with the grooves 22. Consequently, the wind deflector structure 28 must first be manually moved out of its operative position and latched into its storage position. To this end, the operator by a suitable manual movement simply grasps the wind deflector structure 28 and moves it from its operative position against the bias of springs 90 into its storage position. During this movement, tabs 92 engage the cam surfaces 94 of the latch members 96 and serve to pivot the latch members away from their latching position until the wind deflector structure 28 reaches its storage position at which point the leading edges of the tabs move into engagement with the locking surfaces 108 of the latch members 96 and the latter are biased to move into their latching positions. This position of the parts is illustrated in FIG. 5 and it can be seen that when the wind deflector structure 28 is thus retained in its storage position, the operator can now physically insert the tongues 20 within the grooves 22, as is shown in FIG. 5, and then move the removable roof structure 18 fully into its closed position. During the latter movement, the forward cam surfaces 112 engage the cam surfaces 94 of the latch members 96 and serve to move the same out of their latched position. At the same time, the cam surfaces 114 move into a position to engage the bight portion 58 of the wind deflector structure 28 so that the movement of the latter under the bias of springs 90 is now under the control of the cam surfaces 114 and the movement of the removable roof structure 18 as aforesaid.

An important aspect of the invention is the capability of deploying of the wind deflector structure 28 in a most desirable operative position even though such position interferes with and blocks the full operative interengagement of the tongues 20 of the removable roof structure 18 with the grooves 22. In conjunction with this aspect of the invention, the wind deflector structure 28 must not only be capable of being releasably secured in its operative position but in a storage position as well wherein access of the tongues 20 to the grooves 22 is made possible. In the preferred embodiment disclosed above the wind deflector structure is spring biased from its storage position into its operative position so that the spring bias serves to releasably secure the wind deflector structure in its operative position. The wind deflector structure is moved against the spring bias manually and latched into its storage position. It is operable by the cam mechanism to automatically return under the bias of the springs from its storage position into its operative position when the removable roof structure is moved from its closed position into its open condition. It is within the contemplation of the present invention to provide a reverse situation wherein the wind deflector structure is biased into its storage position and is moved manually therefrom into its operative position wherein it is latched, the return movement being in response to a manual unlatching movement. Likewise, the wind deflector structure could be resiliently biased into both its operative position and its storage position, as by an over center spring assembly in which case a partial manual movement would be required in both directions and latching could be eliminated. Finally, latching in both positions and manual movement in both directions without a spring mechanism could be utilized.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

We claim:

1. A removable roof assembly for an opening in a passenger vehicle roof, said vehicle roof opening including forward and rearward ends and sides extending therebetween comprising housing means for mounting beneath the forward end and sides of the vehicle roof opening, a removable roof structure of a size and shape to be mounted in a closed position with respect to the vehicle roof opening, interengageable means between the forward end of said removable roof structure and the forward end of said housing means (1) movable relatively together into full operative interengagement when said removable roof structure is in said closed position to enable the forward end of said removable roof structure to be moved from a removed condition into said closed position in releasably secured condition and (2) movable relatively apart to enable said removable roof structure to be moved out of said closed position into a removed condition, a wind deflector structure of a size and shape to be mounted with respect to said vehicle roof opening when said removable roof structure is in its removed condition in an operative position extending above and along the forward end of the vehicle roof opening and above and rearwardly along the sides thereof such that said wind deflector structure blocks the full operative interengagement of said interengageable means, first means for retaining said wind deflector structure in said operative position and for enabling said wind deflector structure to be moved out of said operative position in response to a manual movement, means mounting said wind deflector structure on said housing means (1) for movement out of said operative position into a storage position within said vehicle roof opening wherein the full operative interengagement of said interengageable means is no longer blocked thereby and (2) for movement from said storage position into said operative position which is prevented when said removable roof structure is in its closed position, and second means for (1) retaining said wind deflector structure in said storage position when moved therein with said removable roof structure in a removed condition so as to enable said interengageable means to be fully operatively interengaged while said wind deflector structure is retained in said storage position and said removable roof structure to be moved into its closed position and (2) permitting said wind deflector structure to be moved into said operative position when said removable roof structure is removed from said closed position, said first means comprising spring means for resiliently biasing said wind deflector out of said storage position and into said operative position so as to resiliently retain the same therein, said second means comprising latch means operable in response to a manual movement of said wind deflector structure from its operative position into its storage position against the bias of said spring means to releasably retain the wind deflector structure in its storage position and cam means on said removable roof structure operable in response to the movement of said removable roof structure into its closed position for releasing said latch means and controlling the movement of said wind deflector structure under the bias of said spring means to move out of its storage position and into its operative position in response to the movement of said removable roof structure out of its closed position into its removed condition.

2. A removable roof assembly as defined in claim 1 wherein said wind deflector structure is of U-shaped configuration in plan view and has an elongated bight portion and a pair of leg portions extending rearwardly from the ends of said bight portion, said mounting means comprising a pair of rearward link members connected at one end of their ends to the rearward ends of said leg portions for pivotal movement about a first common horizontally extending axis and at their opposite ends to said housing means for pivotal movement about a second common axis parallel with said first axis and at least one forward link member connected at one of its ends to the bight portion of said U-shaped wind deflector structure for pivotal movement about a third axis parallel with said first axis and at its opposite end to said housing means for pivotal movement about a fourth axis parallel with said first axis.

3. A removable roof assembly as defined in claim 2 wherein the distance between said first and second axes is generally the same as the distance between said third and fourth axes so that the leg portions of said U-shaped wind deflector structure extend generally horizontally when in said storage position and in said operating position and in any position therebetween.

4. A removable roof assembly as defined in claim 3 wherein said bight portion includes a lower forward edge defined by an elongated member of resilient material operable to engage an edge surface defining the forward end of said vehicle roof opening when said wind deflector structure is in said operative position.

5. A removable roof assembly as defined in claim 3, wherein said third axis is disposed rearwardly of said fourth axis when said wind deflector structure is in said storage position and is disposed forwardly and above said fourth axis when said wind deflector structure is in said operative position.

6. A removable roof assembly as defined in claim 5 wherein said latch means comprises a latch member mounted on said housing means in a position adjacent said forward link member for pivotal movement about a fifth axis spaced rearward from said fourth axis in parallel relation thereto for movement between a locking position and a releasing position and spring means for resiliently biasing said latch member into said locking position.

7. A removable roof assembly as defined in claim 6 wherein said forward link member includes a latch engaging portion and said latch member includes (1) a latch moving surface engageable by said latch engaging portion of said link member during an initial portion of the movement of said wind deflector structure from said operative position into said storage position.

8. A removable roof assembly as defined in claim 7 wherein said cam means includes a cam member fixed to the underside of said removable roof structure adjacent the forward end thereof, said cam member having (1) forward cam surface means for engaging the latch moving surface of said latch member during the movement of said removable roof structure into and out of its closed position so as to move said latch member from its locking position into its releasing position and (2) rearward cam surface means for engaging said wind deflector structure during the movement of the removable roof structure into and out of said storage position when said latch member is moved into its releasing position by said forward cam surface means.

9. A removable roof assembly for an opening in a passenger vehicle roof, said vehicle roof opening including forward and rearward ends and sides extending therebetween comprising
housing means for mounting beneath the forward end and sides of the vehicle roof opening,
a removable roof structure of a size and shape to be mounted in a closed position with respect to the vehicle roof opening,
interengageable means between the forward end of said removable roof structure and the forward end of said housing means (1) movable relatively together into full operative interengagement when said removable roof structure is in said closed position to enable the forward end of said removable roof structure to be moved from a removed condition into said closed position in releasably secured condition and (2) movable relatively apart to enable said removable roof structure to be moved out of said closed position into a removed condition,
a wind deflector structure of a size and shape to be mounted with respect to said vehicle roof opening when said removable roof structure is in its removed condition in an operative position extending above and along the forward end of the vehicle roof opening and above and rearwardly along the sides thereof such that said wind deflector structure blocks the full operative interengagement of said interengageable means,
first means for retaining said wind deflector structure in said operative position and for enabling said wind deflector structure to be moved out of said operative position in response to a manual movement,
means mounting said wind deflector structure on said housing means (1) for movement out of said operative position into a storage position within said vehicle roof opening wherein the full operative interengagement of said interengageable means is no longer blocked thereby and (2) for movement from said storage position into said operative position which is prevented when said removable roof structure is in its closed position, and
second means for (1) retaining said wind deflector structure in said storage position when moved therein with said removable roof structure in a removed condition so as to enable said interengageable means to be fully operatively interengaged while said wind deflector structure is retained in said storage position and said removable roof structure to be moved into its closed position and (2) permitting said wind deflector structure to be moved into said operative position when said removable roof structure is removed from said closed position,
said wind deflector structure is of U-shaped configuration in plan and has an elongated bight portion and a pair of leg portions extending rearwardly from the ends of said bight portion, said mounting means comprising a pair of rearward link members connected at one end of their ends to the rearward ends of said leg portions for pivotal movement about a first common horizontally extending axis and at their opposite ends to said housing means for pivotal movement about a second common axis parallel with said first axis and at least one forward link member connected at one of its ends to the bight portion of said U-shaped wind deflector structure for pivotal movement about a third axis parallel with said first axis and at its opposite end to said housing means for pivotal movement about a fourth axis parallel with said first axis.

10. A removable roof assembly as defined in claim 9 wherein the distance between said first and second axes is generally the same as the distance between said third and fourth axes so that the leg portions of said U-shaped wind deflector structure extend generally horizontally when in said storage position and in said operating position and in any position therebetween.

11. A removable roof assembly as defined in claim 10 wherein said bight portion includes a lower forward edge defined by an elongated member of resilient material operable to engage an edge surface defining the forward end of said vehicle roof opening when said wind deflector structure is in said operative position.

12. A removable roof assembly as defined in claim 9 wherein said third axis is disposed rearwardly of said fourth axis when said wind deflector structure is in said storage position and is disposed forwardly and above said fourth axis when said wind deflector structure is in said operative position.

13. A removable roof assembly as defined in claim 9 wherein said second means comprises a latch member mounted on said housing means in a position adjacent said forward link member for pivotal movement about a fifth axis spaced rearward from said fourth axis in parallel relation thereto for movement between a locking position and a releasing position and spring means for resiliently biasing said latch member into said locking position.

14. A removable roof assembly as defined in claim 13 wherein said forward link member includes a latch engaging portion and said latch member includes (1) a latch moving surface engageable by said latch engaging portion of said link member during an initial portion of the movement of said wind deflector structure from said operative position into said storage position.

15. A removable roof assembly as defined in claim 14 wherein said cam means includes a cam member fixed to the underside of said removable roof structure adjacent the forward end thereof, said cam member having (1) forward cam surface means for engaging the latch moving surface of said latch member during the movement of said removable roof structure into and out of its closed position so as to move said latch member from its locking position into its releasing position and (2) rearward cam surface means for engaging said wind deflector structure during the movement of the removable roof structure into and out of said storage position when said latch member is moved into its releasing position by said forward cam surface means.

16. In a removable roof assembly for an opening in a passenger vehicle roof, said vehicle roof opening including forward and rearward ends and sides extending therebetween comprising housing means for mounting beneath the forward end and sides of the vehicle roof opening, a removable roof structure of a size and shape to be mounted in a closed position with respect to the vehicle roof opening, interengageable means between the forward end of said removable roof structure and the forward end of said housing means for enabling the forward end of said removable roof structure to be moved (1) from a removed condition into said closed position in releasably secured condition and (2) out of said closed position into a removed condition, a wind deflector structure of a size and shape to be mounted in an operative position with respect to said vehicle roof opening when said removable roof structure is in its removed condition, and means mounting said wind deflector structure on said housing means for movement between said operative position and a storage position within said vehicle roof opening, the improvement which comprises:

said wind deflector structure being of U-shaped configuration in plan view and having an elongated bight portion and a pair of leg portions extending rearwardly from the ends of said bight portion, said mounting means comprising a pair of rearward link members connected at one end of their ends to the rearward ends of said leg portions for pivotal movement about a first common horizontally extending axis and at their opposite ends to said housing means for pivotal movement about a second common axis parallel with said first axis and at least one forward link member connected at one of its ends to the bight portion of said U-shaped wind deflector structure for pivotal movement about a third axis parallel with said first axis and at its opposite end to said housing means for pivotal movement about a fourth axis parallel with said first axis.

17. The improvememt as defined in claim 16 wherein the distance between said first and second axes is generally the same as the distance between said third and fourth axes so that the leg portions of said U-shaped wind deflector structure extend generally horizontally when in said storage position and in said operating position and in any position therebetween.

18. The improvement as defined in claim 17 wherein said bight portion includes a lower forward edge defined by an elongated member of resilient material operable to engage an edge surface defining the forward end of said vehicle roof opening when said wind deflector structure is in said operative position.

19. The improvement as defined in claim 18 wherein said third axis is disposed rearwardly of said fourth axis when said wind deflector structure is in said storage position and is disposed forwardly and above said fourth axis when said wind deflector structure is in said operative position.

* * * * *